(12) United States Patent
Oka

(10) Patent No.: US 11,387,720 B2
(45) Date of Patent: Jul. 12, 2022

(54) RETAINING APPARATUS, RETAINING METHOD AND INSERT METHOD OF WAVE WINDING COIL

(71) Applicant: HONDA MOTOR CO., LTD., Tokyo (JP)

(72) Inventor: Keiichiro Oka, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 686 days.

(21) Appl. No.: 16/241,201

(22) Filed: Jan. 7, 2019

(65) Prior Publication Data

US 2019/0222104 A1 Jul. 18, 2019

(30) Foreign Application Priority Data

Jan. 15, 2018 (JP) .............................. JP2018-004332

(51) Int. Cl.
| | |
|---|---|
| *H02K 15/04* | (2006.01) |
| *H02K 3/12* | (2006.01) |
| *H02K 15/06* | (2006.01) |
| *H02K 3/28* | (2006.01) |

(52) U.S. Cl.
CPC ........... *H02K 15/0478* (2013.01); *H02K 3/12* (2013.01); *H02K 15/04* (2013.01); *H02K 15/0442* (2013.01); *H02K 15/06* (2013.01); *H02K 15/066* (2013.01); *H02K 3/28* (2013.01)

(58) Field of Classification Search
CPC ............... H02K 15/04; H02K 15/0442; H02K 15/0478; H02K 15/06; H02K 15/066; H02K 3/12; H02K 3/28; H04B 1/38; H04L 15/30
See application file for complete search history.

(56) References Cited

U.S. PATENT DOCUMENTS

| | | | | |
|---|---|---|---|---|
| 3,101,180 | A | * | 8/1963 | Sadorf ................... H01F 41/092 242/473.9 |
| 3,787,000 | A | * | 1/1974 | Farnsworth .......... H02K 15/085 242/432.4 |
| 4,756,075 | A | * | 7/1988 | Dolgas ..................... H02K 3/00 29/596 |

(Continued)

FOREIGN PATENT DOCUMENTS

| | | |
|---|---|---|
| CN | 102812620 A | 12/2012 |
| CN | 106416021 A | 2/2017 |
| JP | 2017-158255 | 9/2017 |

OTHER PUBLICATIONS

Chinese Office Action dated Aug. 13, 2019, 9 pages.

*Primary Examiner* — Minh N Trinh

(74) *Attorney, Agent, or Firm* — Rankin, Hill & Clark LLP

(57) ABSTRACT

A wave winding coil (9) has a first linear part (11*a*), second linear part (11*b*), arm part (12) and turn part (13). A retaining apparatus (1) retains the first linear part (11*a*) along the axis line direction between middle pins (3*b*, 3*b*) of a middle body part (3), and retains the second linear part (11*b*) between upper pins (2*b*, 2*b*), middle pins (3*b*, 3*b*), and lower pins (4*b*, 4*b*), in a state where sections of both ends of the second linear part (11*b*) in the axis line direction deviate to each other in circumferential opposite sides of the wave winding coil (9) to the axis line direction of the wave winding coil (9) and in a state where a bent angle θb' between the second linear part (11*b*) and the connecting part is smaller than a bent angle θa' between the first linear part (11*a*) and the connecting part.

3 Claims, 13 Drawing Sheets

(56) References Cited

U.S. PATENT DOCUMENTS

| | | | | |
|---|---|---|---|---|
| 5,512,803 | A * | 4/1996 | Endo | H01J 29/003 |
| | | | | 315/370 |
| 5,794,884 | A * | 8/1998 | Dolgas | H02K 1/12 |
| | | | | 242/433.3 |
| 8,884,484 | B2 * | 11/2014 | Krauth | H02K 3/47 |
| | | | | 310/71 |
| 9,056,350 | B2 * | 6/2015 | Maier | H02K 15/0478 |
| 2019/0222104 | A1 * | 7/2019 | Oka | H02K 3/12 |

* cited by examiner

RETAINING APPARATUS, RETAINING METHOD AND INSERT METHOD OF WAVE WINDING COIL

BACKGROUND OF THE INVENTION

Field of the Invention

The present invention relates to a retaining apparatus of a wave winding coil that, at the time of attaching a wave winding coil to an annular stator of an electric rotating machine, retains the wave winding coil before the attachment.

Description of the Related Art

There is conventionally known a wave winding coil to be attached to a stator of an electric rotating machine as described in Japanese Patent Laid-Open No. 2017-158255. This wave winding coil is formed by combining many coil members, and the coil member has two linear parts and a connecting part. The two linear parts are arranged in parallel with each other, and an end of one of the two linear parts are integrally connected with an end of the other by a "V" letter-shaped connecting part.

In a case of attaching the wave winding coil to the stator, the two linear parts of the coil member are respectively inserted in two slots of the stator in an axis line direction of the stator, and tip ends of the linear parts that have passed through the slots are subjected to bending work. After inserting a great number of the coil members in the slots, a great number of the bent coil members each other are welded to be united together, thus attaching the wave winding coil to the stator.

According to the conventional wave winding coil as described above, it is necessary to execute a work of inserting a great number of the coil members in the slots and a work of welding a great number of sections after the insert. Therefore the man-hour may be increased, leading to an increase on manufacturing costs. For avoiding this, it is required to reduce the number of components in the wave winding coil and at the same time, attach the wave winding coil to the stator without using the welding.

Such an attachment method is thought to, for example, form a wave winding coil in an annular shape before the attachment to the stator, retain the wave winding coil by a retaining device of a jig or the like in a state of being reduced in a diameter to be smaller than an inner diameter of a stator, and enlarge the diameter of the wave winding coil from that state to insert the wave winding coil in slots of the stator. However, since it is required to enlarge and reduce the entire annular wave winding coil, loads at enlargement and reduction may increase.

The present invention is made in view of the foregoing problem, and has an object of providing a retaining apparatus and the like of a wave winding coil that can retain an annular wave winding coil in a state of being capable of reducing loads at enlargement and reduction before being attached to a stator.

SUMMARY OF THE INVENTION

For achieving the above object, a retaining apparatus 1 of a wave winding coil 9 according to the present invention to, when an annular wave winding coil is reduced in a diameter and is then enlarged in a diameter, while being inserted in slots 6a of an annular stator 6 in an electric rotating machine along a radial direction of the stator 6, retain the wave winding coil 9 in a state of being reduced in a diameter before the insertion, wherein the wave winding coil 9 including: first linear parts 11a and second linear parts 11b that are alternately provided with predetermined intervals in the circumferential direction of the wave winding coil 9 to be inserted in the slots 6a at diameter enlargement; and connecting parts (arm part 12 and turn part 13) that alternately connect between one end of the first linear part 11a and one end of the second linear part 11b and between the other end of the first linear part 11a and the other end of the second linear part 11b, and the apparatus comprising: an apparatus body (upper body part 2, middle body part 3 and lower body part 4); and retaining parts (upper pin 2b, middle pin 3b and lower pin 4b) that are provided in the apparatus body to retain the first linear part 11a in a state of being along an axis line direction of the wave winding coil 9 and retain the second linear part 11b in a state where sections of both ends of the second linear part 11b deviate to each other in circumferential opposite sides of the wave winding coil 9 to the axis line direction of the wave winding coil 9 and in a state where a bent angle θb' between the second linear part 11b and the connecting part (arm part 12) is made smaller than a bent angle θa' between the first linear part 11a and the connecting part (arm part 12).

According to the retaining apparatus of the wave winding coil, by the retaining part the first linear part of the wave winding coil is retained in a state of being along the axis line direction of the wave winding coil and the second linear part is retained in a state where the sections of both the ends of the second linear part in the axis line direction deviate to each other in the circumferential opposite sides of the wave winding coil to the axis line direction of the wave winding coil and in a state where the bent angle between the second linear part and the connecting part is made smaller than the bent angle between the first linear part and the connecting part. In a case where the wave winding coil will be pressed in an outer diameter direction from this retaining state to be enlarged in a diameter, the first linear part, the second linear part and the connecting part result in simultaneously moving in the outer diameter direction. At this time, the first linear part moves in a state of being along the axis line direction, and the second linear part, since the bent angle between the second linear part and the connecting part is made smaller than the bent angle between the first linear part and the connecting part, moves in the outer diameter direction while being deformed such that this bent angle becomes larger. In this way, since it is possible to cause the second linear part to move while being deformed such that the bent angle between the second linear part and the connecting part increases at diameter enlargement, the load at diameter enlargement can be made smaller than when the first linear part and the second linear part are retained in parallel. Further, the wave winding coil, after the first linear part and the second linear part are deformed to be in the above-mentioned state, is caused to be retained by the retaining apparatus while being reduced in a diameter. Consequently it is possible to reduce the load at diameter reduction.

In the present invention, the retaining part includes at least one set of first retaining parts (upper pins 2b, 2b and lower pins 4b, 4b) that is arranged along a circumferential direction of the apparatus body, the set of first retaining part is a pair of first retaining parts arranged to be separated from each other in an axis line direction of the apparatus body, and the pair of the first retaining parts are configured to be movable relatively to the circumferential direction of the apparatus body, and it is preferable to retain the sections of both the ends of the second linear part 11b in the axis line direction in a state of deviating to each other in the circumferential opposite sides of the wave winding coil 9.

According to the retaining apparatus of the wave winding coil, by the pair of the first retaining parts, the sections of both the ends of the second linear part 11b in the axis line direction are retained in a state of deviating to each other in the circumferential opposite sides of the wave winding coil. Since the pair of the first retaining parts are configured to be movable relatively to the circumferential direction of the apparatus body, these retaining parts are used as jigs, thus making it possible to set a deviation degree in the sections of both the ends of the second linear part at will. Since the pair of the first retaining parts are arranged to be separated from each other in the axis line direction of the apparatus body, the deviation in the sections of both the ends of the second linear part can be easily formed. Further, since the pair of the first retaining parts are configured to be movable relatively to the circumferential direction of the apparatus body, by appropriately setting a radial length of the first retaining part, it is possible to easily deform the second linear part to be in a state of being along the axis line direction of the wave winding coil before enlarging a diameter of the wave winding coil and inserting the diameter-enlarged wave winding coil in the slot.

In the present invention, each of the pair of the retaining parts preferably includes a pair of pins (upper pins 2b, 2b, lower pins 4b, 4b) retaining the second linear part in a way of sandwiching from both the sides in the circumferential direction.

According to the retaining apparatus of the wave winding coil, since each of the first retaining parts includes the pair of the pins retaining the second linear part in a way of sandwiching from both the sides in the circumferential direction, it is possible to easily retain the sections of both the ends of the second linear part in a state of deviating to each other in the circumferential direction. Further, as described above, it is possible to further easily execute a work of deforming the second linear part to be in a state of being along the axis line direction of the wave winding coil before enlarging a diameter of the wave winding coil and inserting the diameter-enlarged wave winding coil in the slot.

In the present invention, the retaining parts are arranged along the circumferential direction of the apparatus body and further includes at least one second retaining part (middle pins 3b, 3b) different from the first retaining part, and it is preferable that at least the one second retaining part (middle pins 3b, 3b) is configured to retain a predetermined section of the second linear part 11b between the sections in both the ends of the second linear part 11b.

According to the retaining apparatus of the wave winding coil, a plurality of the second retaining parts different from the first retaining part are arranged along the circumferential direction of the apparatus body, and at least the one second retaining part retains a predetermined section of the second liner part between the sections in both the ends in the second linear part. Therefore at the time of forming the deviation of the sections in both the ends of the second linear part in the axis line direction, this deviation can be formed while positioning the second linear part in the circumferential direction. Further, as described above, it is possible to deform the second linear part to be in the state of being along the axis line direction of the wave winding coil while positioning the second linear part in the circumferential direction before enlarging the diameter of the wave winding coil and inserting the diameter-enlarged wave winding coil in the slot, and it is possible to easily execute the work of inserting the second linear part in the slot.

In the present invention, it is preferable that at least one of the pair of the first retaining parts (upper pins 2b, 2b and lower pins 4b, 4b) and the second retaining part (middle pins 3b, 3b) deform the sections of both the ends of the second linear part 11b in the axis line direction to deviate to each other in the circumferential opposite sides of the wave winding coil 9 and then retain the sections in the deformed state.

According to the retaining apparatus of the wave winding coil, the retaining apparatus that deforms the sections of both the ends of the second linear part in the axis line direction to deviate to each other in the circumferential opposite sides of the wave winding coil and then can reform the sections in the deformed state can be realized by the pair of the first retaining parts and the second retaining part or one of the pair of the first retaining parts and the second retaining part.

In the present invention, the apparatus body includes a first apparatus body (upper body part 2) that has an outer peripheral surface 2a in a cylindrical surface shape and is provided with one (upper pins 2b, 2b) of the pair of the first retaining parts on the outer peripheral surface 2a, a second apparatus body (lower body part 4) that has an outer peripheral surface 4a in a cylindrical surface shape and is provided with the other (lower pins 4b, 4b) of the pair of the first retaining parts on the outer peripheral surface 4a, and a third apparatus body that is arranged between the first apparatus body (upper body part 2) and the second apparatus body (lower body part 4), has an outer peripheral surface 3a in a cylindrical surface shape and is provided with the second retaining part (middle pins 3b, 3b) on the outer peripheral surface 3a, and it is preferable that the first apparatus body to the third apparatus body (upper body part 2, lower body part 4 and middle body part 3) are arranged coaxially with each other to the axis line of the apparatus body and the first apparatus body (upper body part 2) and the second apparatus body (lower body part 4) are configured to be rotatable in opposite directions to each other along the circumferential direction of the apparatus body.

According to the retaining apparatus of the wave winding coil, the apparatus body includes the first apparatus body to the third apparatus body that are arranged coaxially with each other to the axis line of the apparatus body, one of the pair of the first retaining parts is provided on the outer peripheral surface of the first apparatus body, the other of the pair of the first retaining parts is provided on the outer peripheral surface of the second apparatus body and the second retaining part is provided on the outer peripheral surface of the third apparatus body. Further, since the first apparatus body and the second apparatus body are configured to be rotatable in the opposite directions to each other along the circumferential direction of the apparatus body, as described above the deviation degree of the sections of both the ends of the second linear part can be set at will, and simultaneously such a jig can be realized as a single apparatus composed of the three apparatus bodies.

In the present invention, it is preferable that the retaining apparatus of the wave winding coil further includes a guide part (guide pins 6c, 6c) that extends radially along the slot 6a outside of the stator 6 and guides the first linear part 11a to the slot 6a at diameter enlarge of the wave winding coil 9.

According to the retaining apparatus of the wave winding coil, since the first linear part is guided in the slot at diameter enlarge of the wave winding coil by the guide part that extends radially along the slot outside of the stator, the work of inserting the first linear part in the slot can be easily executed.

In the present invention, it is preferable that the second linear part 11b of the wave winding coil 9 is provided in a state of deviating to a radial inside of the wave winding coil 9 by a predetermined distance (deviation amount L1) from the first linear part.

According to the retaining apparatus of the wave winding coil, the second linear part of the wave winding coil is provided in a state of deviating to the radial inside of the wave winding coil by a predetermined length from the first linear part. Therefore by appropriately setting the predetermined distance, the second linear part is deformed to be in a state of being along the axis line direction of the wave winding coil after inserting the first linear part in the slot, and then the second linear part can be inserted in the slot. Consequently as compared with a case where the first linear part and the second linear part are provided radially with the same positional relation, when the first linear part is inserted in the slot, it is possible to deform the second linear part to be in a state of being along the axis line direction of the wave winding coil in a state where the wave winding coil is enlarged more in a diameter and further reduce the load at the deforming work.

In the present invention, it is preferable that the connecting part of the wave winding coil 9 includes two arm parts 12, 12 extending to approach to each other while bending in the circumferential direction of the wave winding coil 9 from the first linear part 11a and the second linear part 11b, and a turn part 13 that twists from one of the two arm parts 12, 12 to make one rotation and is successive to the other of the two arm parts 12, 12.

According to the retaining apparatus of the wave winding coil, the connecting part of the wave winding coil includes the two arm parts extending to approach to each other while bending in the circumferential direction of the wave winding coil from the first linear part and the second linear part, and the turn part that twists from one of the two arm parts to make one rotation and is successive to the other of the two arm parts. Therefore at the time of deforming the second linear part such that the bent angle between the second linear part and the connecting part becomes larger at the diameter enlargement of the wave winding coil, the turn part can be deformed such that curvature of the section making one rotation is made larger. Accordingly as compared with a case of being not provided with the turn part, the load at the diameter enlargement can be further reduced.

For achieving the aforementioned object, a retaining method of a wave winding coil 9 according to the present invention to, when an annular wave winding coil is reduced in a diameter and is then enlarged in a diameter, while being inserted in a slot 6a of an annular stator 6 in an electric rotating machine along a radial direction of the stator 6, annually retain the wave winding coil 9 in a state of being reduced in a diameter before the insert by a retaining apparatus 1, wherein the wave winding coil 9 including: first linear parts 11a and second linear parts 11b that are alternately provided with predetermined intervals in the circumferential direction of the wave winding coil 9 to be inserted in the slots 6a at diameter enlargement; and connecting parts (arm part 12 and turn part 13) that alternately connect between one end of the first linear part 11a and one end of the second linear part 11b and between the other end of the first linear part 11a and the other end of the second linear part 11b, and the retaining apparatus 1, retains the first linear part 11a in a state of being along an axis line direction of the wave winding coil 9; and also retains the second linear part 11b in a state where sections of both ends of the second linear part 11b in the axis line direction deviate to each other in circumferential opposite sides of the wave winding coil 9 to the axis line direction of the wave winding coil 9 and in a state where a bent angle between the second linear part 11b and the connecting part is made smaller than a bent angle between the first linear part 11a and the connecting part.

According to the retaining method of the wave winding coil, it is possible to achieve the same operational effect as the retaining apparatus of the wave winding coil as described above.

For achieving the aforementioned object, an insert method of the wave winding coil 9 according to the present invention is characterized in that the wave winding coil retained by the above retaining method of the wave winding coil is enlarged in a diameter with the second linear part 11b deformed to be in a state of being along the axis line direction of the wave winding coil 9 and then inserted in the slot 6a of the stator 6 in the electric rotating machine along a radial direction of the stator 6.

According to the insert method for the wave winding coil, it is possible to insert the wave winding coil in the slot while reducing the load at the enlargement and reduction.

DETAILED DESCRIPTION OF THE PREFERRED EMBODIMENT

Hereinafter, an explanation will be made of a retaining apparatus, a retaining method and an insert method of a wave winding coil according to embodiments of the present invention with reference to the drawings. A retaining apparatus in the present embodiment corresponds to a jig for, at the time of attaching a wave winding coil to be described later to a stator for an electric rotating machine, retaining the wave winding coil before the attachment.

Figure 1:
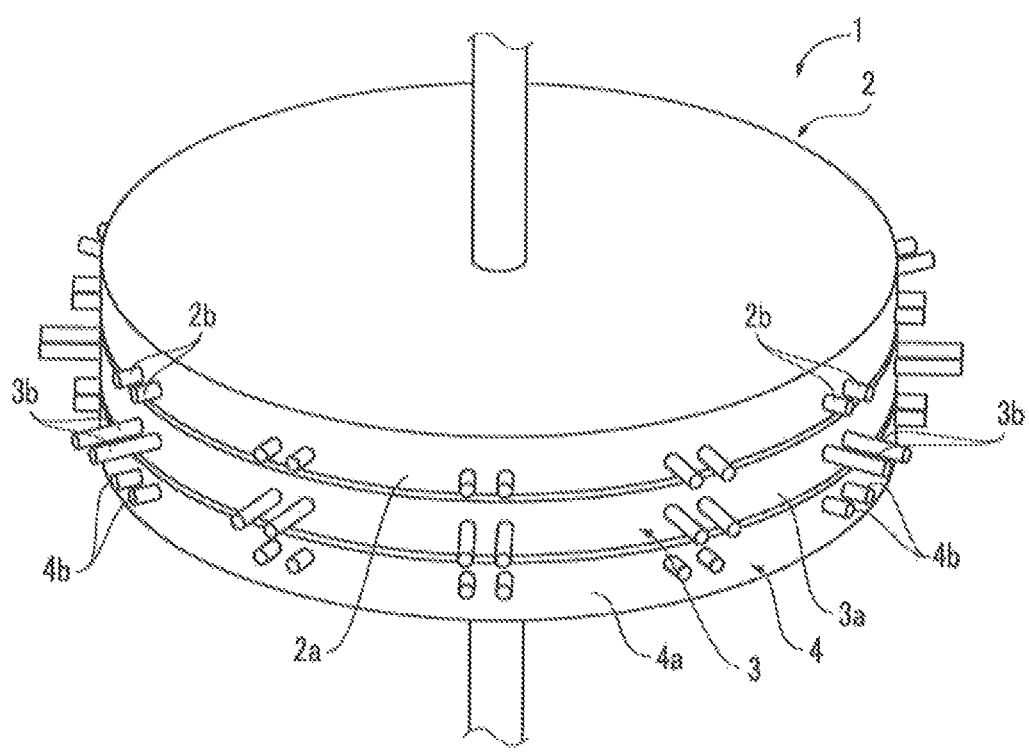
FIG. 1 is a perspective view illustrating a configuration of a retaining apparatus of a wave winding coil according to an embodiment of the present invention.

As illustrated in FIG. 1, a retaining apparatus 1 includes an upper body part 2, a middle body part 3 and a lower body part 4 in that order from an upper side toward a lower side in the same figure. The three body parts 2 to 4 each are formed in a disc shape having the same diameter and are arranged coaxially with each other. It should be noted that in the following explanation, for descriptive purposes, an upper side in FIG. 1 is called "upper" and a lower side is called "lower", and also a radial direction, a circumferential direction and an axis line direction of the retaining apparatus 1 each are called "radial direction", "circumferential direction" and "axis line direction".

The upper body part 2 is made of metal (for example, stainless), and an outer peripheral surface 2a thereof is formed in a cylindrical surface. In FIG. 1, a pair of upper pins 2b, 2b lining up in the circumferential direction of the outer peripheral surface 2a make one set, and a total of 12 sets of the upper pins 2b, 2b are arranged in a central position of the outer peripheral surface 2a in the upper-lower direction to be equally spaced from each other over the entire circumference. This figure is a schematic diagram, and the upper pins 2b, 2b in number corresponding to the slot number of the stator are arranged in an actual apparatus.

The upper pins 2b each are made of metal (for example, stainless) in a columnar shape, and are fixed to the upper body part 2 in a state of projecting radially from the outer peripheral surface 2a of the upper body part 2. In the present embodiment, the upper body part 2 corresponds to an apparatus body and a first apparatus body, and the upper pin 2b corresponds to a retaining part and a first retaining part.

One set of the upper pins 2b, 2b retain a linear part 11 (refer to FIG. 2B) of a coil member 10 to be described later in a loose fitting state therebetween, and an interval therebetween is set to be slightly larger than a circumferential width of the linear part 11. In addition thereto, a length of both, that is, a projection length from the outer peripheral surface 2a is set to a value slightly shorter than a deviation amount L1 to be described later. This reason will be described later.

The middle body part 3 is, in the same way as the upper body part 2, made of metal (for example, stainless), and an outer peripheral surface 3a thereof is formed in a cylindrical surface shape. A pair of middle pins 3b, 3b lining up in the circumferential direction of the outer peripheral surface 3a make one set, and a total of 12 sets of the middle pins 3b, 3b are arranged in a central position of the outer peripheral surface 3a in the upper-lower direction to be equally spaced from each other over the entire circumference.

The middle pins 3b each are, in the same way as the aforementioned pin 2b, made of a columnar metal (for example, stainless), and are fixed to the middle body part 3 in a state of projecting radially from the outer peripheral surface 3a of the middle body part 3. In the present embodiment, the middle body part 3 corresponds to the apparatus body and a third apparatus body, and the middle pin 3b corresponds to the retaining part and a second retaining part.

One set of the middle pins 3b, 3b also retain, in the same way as one set of the upper pins 2b, 2b, the linear part 11 of the coil member 10 to be described later in a loose fitting state therebetween, and an interval therebetween is set to the same value as the interval between the one set of the upper pins 2b, 2b. A length of the one set of the middle pins 3b, 3b is set to a value longer than one set of the upper pins 2b, 2b and slightly shorter than twice as long as the deviation amount L1. This reason will be described later.

On the other hand, the lower body part 4 is made of metal (for example, stainless), and is configured to be identical to the aforementioned upper body part 2. That is, an outer peripheral surface 4a of the lower body part 4 is formed in a cylindrical surface shape. A pair of lower pins 4b, 4b lining up in the circumferential direction of the outer peripheral surface 4a make one set, and a total of 12 sets of the lower pins 4b, 4b are arranged in a central position of the outer peripheral surface 4a in the upper-lower direction to be equally spaced from each other over the entire circumference.

The lower pins 4b each are made of a columnar metal (for example, stainless), and are fixed to the lower body part 4 in a state of projecting radially from the outer peripheral surface 4a of the lower body part 4. In the present embodiment, the lower body part 4 corresponds to the apparatus body and a second apparatus body, and the lower pin 4b corresponds to the retaining part and the first retaining part.

One set of the lower pins 4b, 4b also retain, in the same way as one set of the upper pins 2b, 2b and one set of the middle pins 3b, 3b, the linear part 11 of the coil member 10 to be described later in a loose fitting state therebetween, and an interval therebetween and a projection length thereof are set to the same values as the interval between the one set of the upper pins 2b, 2b and the projection length thereof. An interval between the upper pin 2b and the lower pin 4b in the upper-lower direction is set to a value substantially equal to the length of the linear part 11, and the middle pin 3b is arranged in the center of both of them in the upper-lower direction.

In the three body parts 2 to 4, the middle body part 3 is provided to be non-rotatable around the center axis line of the retaining apparatus 1, and the upper body part 2 and the lower body part 4 are provided to be rotatable around the center axis line of the retaining apparatus 1. Unillustrated actuators are connected to the upper body part 2 and the lower body part 4, which are configured to be driven in rotating directions different from each other by the actuators. This reason will be described later.

Figure 4:
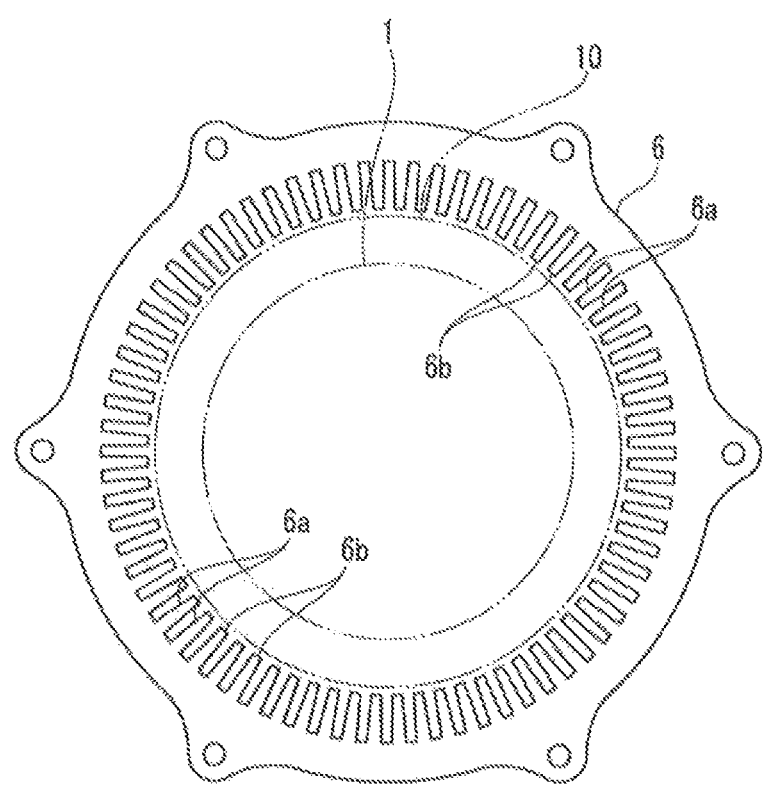
FIG. 4 is a front view of the stator.

Next, an explanation will be made of the wave winding coil retained by the retaining apparatus 1 in the present embodiment. The wave winding coil 9 is attached to the stator 6 for the electric rotating machine as illustrated in FIG. 4. A predetermined number of the slots 6a (72 slots in the present embodiment) line up in the circumferential direction on the inner periphery of the stator 6, and each of the slots 6a is formed between neighboring two core teeth 6b, 6b.

Figure 2:
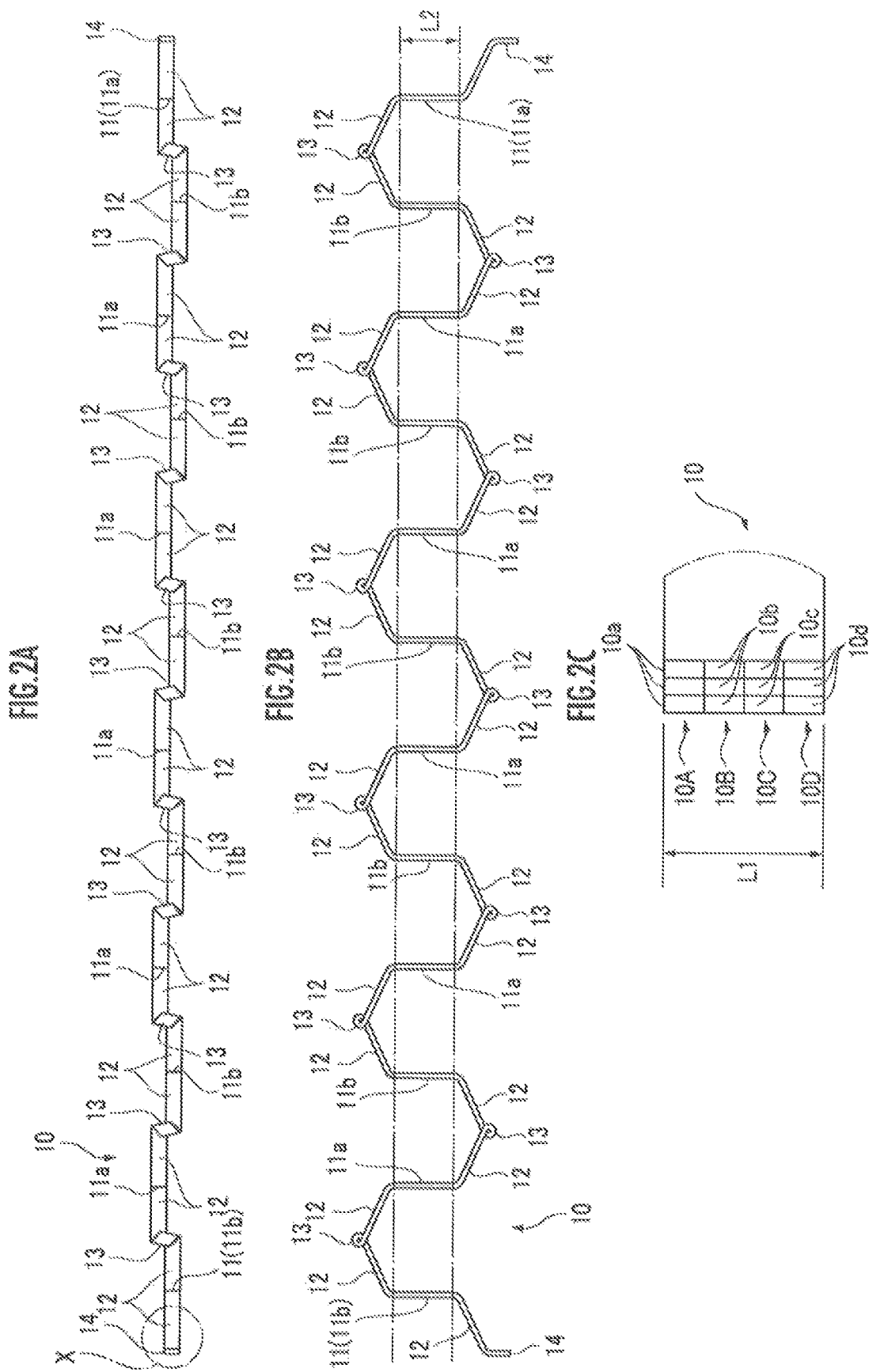
FIG. 2A is a front view of a coil member of the wave winding coil.
FIG. 2B is a plan view of the coil member.
FIG. 2C is an enlarged view of X part in FIG. 2A.
Figure 5:
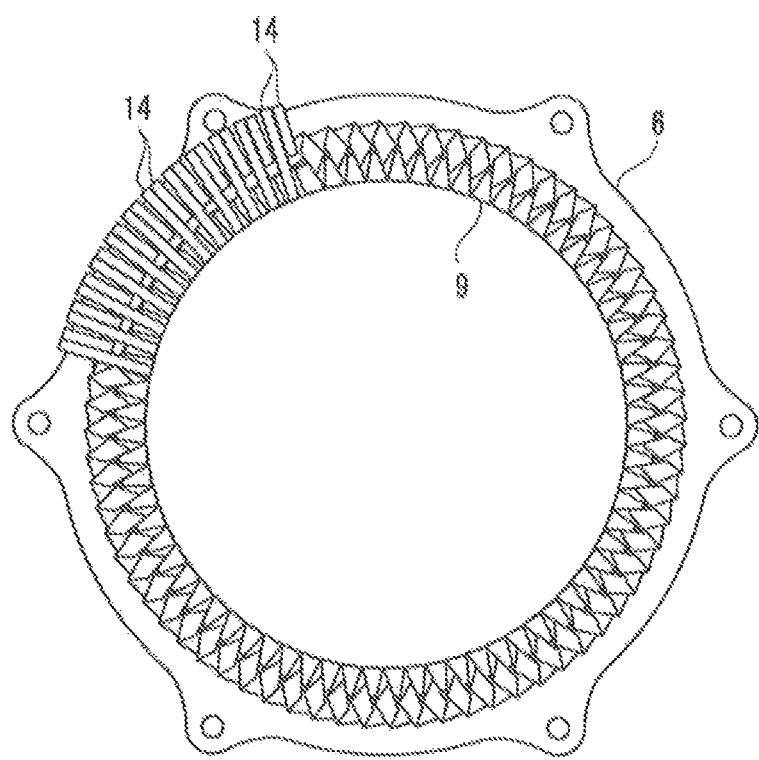
FIG. 5 is a front view illustrating a state where the wave winding coil is attached to the stator.

The wave winding coil 9 is attached to the stator 6 in a state as illustrated in FIG. 5 by inserting a plurality of the coil members 10 (for example, 12 pieces) as illustrated in FIGS. 2A and 2B in the slots 6a of the stator 6.

Figure 3:
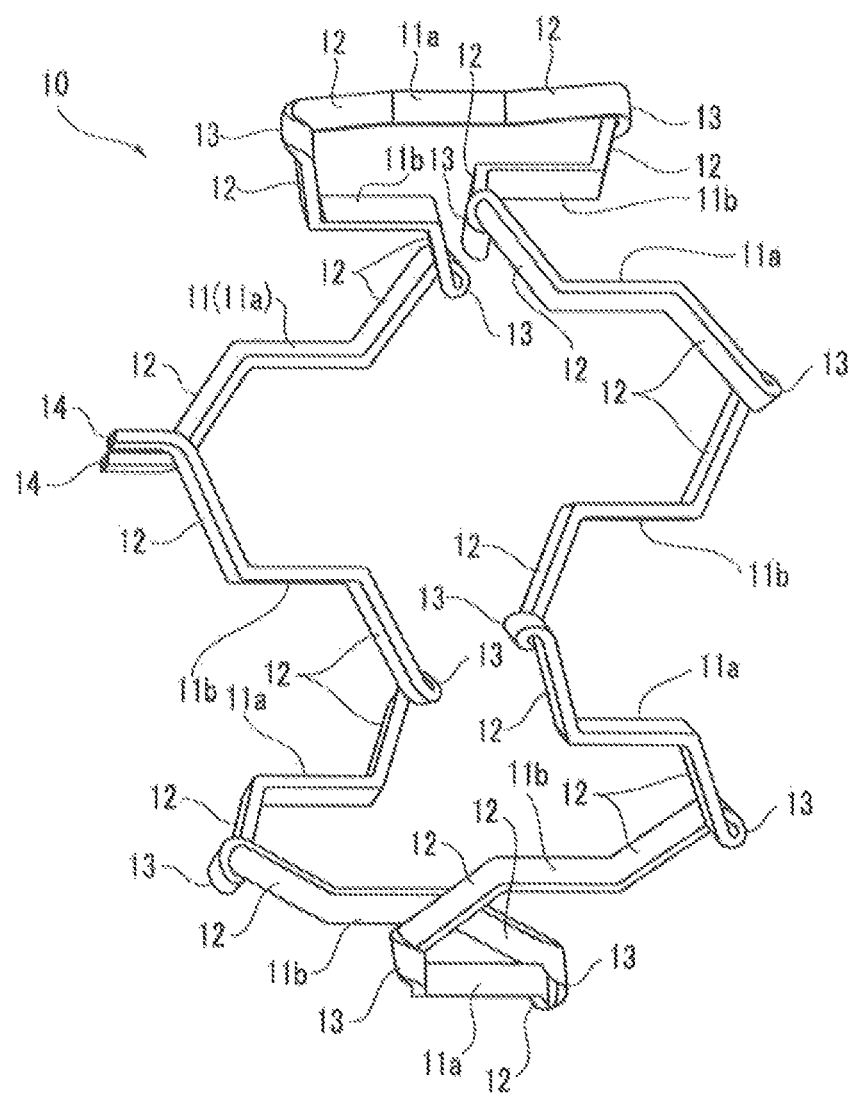
FIG. 3 is a perspective view illustrating a state where the coil members is attached to a stator.

The coil member 10 is in an annular shape as illustrated in FIG. 3 in a state of being attached to the stator 6, and this state corresponds to a shape in which both ends of the coil member 10 as illustrated in FIG. 2A are pulled downward to curve the coil member 10. The coil member 10 is once attached to the retaining apparatus 1 in a state of being annually reduced in a diameter, and after that, is enlarged in a diameter to be attached to the stator 6 to be described later, and therefore also in the explanation of each component of the coil member 10 hereinafter, a radial direction and a circumferential direction of the retaining apparatus 1 are called "radial direction" and "circumferential direction" of the coil member 10 as needed.

The coil member 10 is, as illustrated in FIG. 2C, formed by combining four coil elements 10A to 10D integrally, and each of the four coil elements 10A to 10D is formed of three wires.

Specifically the coil element 10A is formed of three wires 10a, which are set to have the same cross-sectional area with each other and the long sides line up in a state of being contacting with each other. In addition, the coil element 10B is formed of three wires 10b, which are also set to have the same cross-sectional area with each other and the long sides line up in a state of being contacting with each other.

Further, the coil element 10C is formed of three wires 10c, which are also set to have the same cross-sectional area with each other and the long sides line up in a state of being contacting with each other. The coil element 10D is formed of three wires 10d, which are also set to have the same cross-sectional area with each other and the long sides line up in a state of being contacting with each other.

Each of the 12 wires 10a to 10d as described above is of a rectangular type, and is a wire formed by coating a surface of a metal having high conductivity (for example, copper or aluminum alloy) with an insulating material. In FIGS. 2A to 2C, a line showing each of the wires 10a to 10d is omitted in illustration for easy understanding, and this point is likewise applied to each of figures to be described later.

The coil member 10 includes, as illustrated in FIGS. 2A to 2B, the linear parts 11, arm parts 12, turn parts 13 and connecting parts 14, and these elements 11 to 14 are formed integrally by executing flatwise bending to the four coil elements 10A to 10D. That is, in the four coil elements 10A to 10D, long sides of the three wires are bent in a direction of being contacting with each other to form the above elements 11 to 14 integrally.

The linear part 11 extends along the axis line direction, and is a section inserted in the slot 6a of the stator 6 when the coil member 10 is attached to the stator 6, and includes a first linear part 11a and a second linear part 11b.

The first and second linear parts 11a, 11b are alternately arranged in the circumferential direction, and the first linear part 11a is provided with a positional relation of deviating in an outer diameter direction (offset positional relation) by a radial thickness L1 of the four wires 10a to 10d to the second linear part 11b. Hereinafter, this thickness L1 is called "deviation amount L1".

In addition, each of the first and second linear parts 11a, 11b has a length between both ends thereof that is slightly longer than a size of the slot 6a in the axis line direction, and, when inserted in the slot 6a, a section of a length L2 as illustrated in FIG. 2B is fitted in the slot 6a.

Further, a pair of the arm parts 12, 12 are bent from the first and second linear parts 11a, 11b to the circumferential direction of the wave winding coil 9, and extend to the turn part 13 to approach to each other. The turn parts 13 twists from one end of one arm part 12 to make one rotation and is successive to one end of the other arm part 12.

With this configuration of the turn part 13, a pair of the arm parts 12, 12 in both the sides of the turn part 13 are configured to radially deviate by the aforementioned deviation amount L1 (predetermined distance) to each other. In addition thereto, the neighboring two turn parts 13, 13 each make one rotation and twist in opposite directions relative to the radial direction of the wave winding coil 9. With the above configuration, as described above, the first linear part 11a is provided with the positional relation of deviating in the outer diameter direction by the deviation amount L1 from the second linear part 11b.

Next, an explanation will be made of an attaching method of attaching the wave winding coil 9 as configured above to the stator 6. In a case of the attaching method, as described hereinafter, the two coil members 10, 10 are once retained in the retaining apparatus 1, and after that, are attached to the stator 6.

Figure 6:
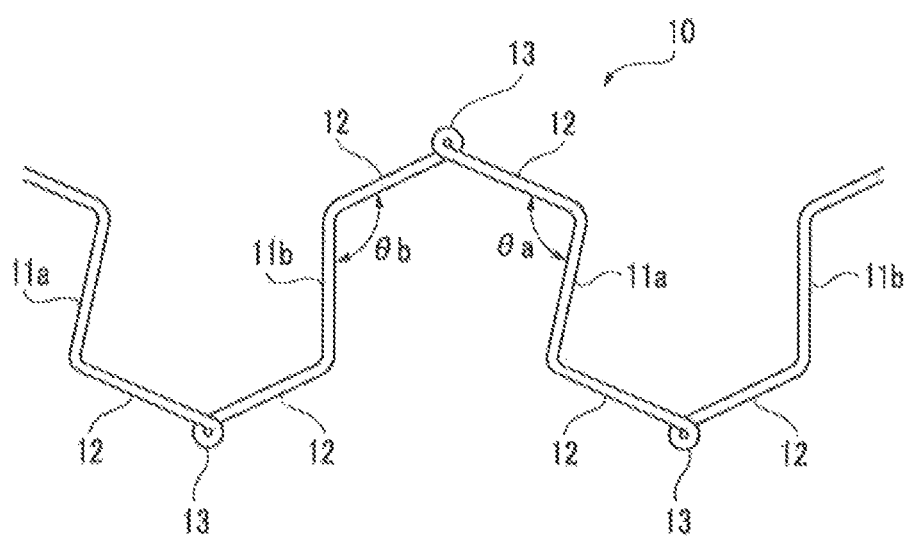
FIG. 6 is a diagram illustrating a deformed state of a single coil member before being attached to the retaining apparatus.

First, an unillustrated jig is used to deform the coil member 10 from a state as illustrated in FIG. 2B to a state as illustrated in FIG. 6. That is, the coil member 10, while the second linear part 11b is retained in a state of being along the axis line direction, is bent in such a shape that both ends of the first linear part 11a deviate to each other in circumferential opposite sides to the axis line direction of the coil member 10 and a bent angle θa between the first linear part 11a and the arm part 12 is made smaller than a bent angle θb between the second linear part 11b and the arm part 12.

Next, the two coil members 10 deformed as described above are combined as illustrated in FIG. 7. That is, the two coil members 10 are respectively arranged oppositely in the upper-lower direction, and are combined such that one second linear part 11b is positioned on an outer diameter side (front side in the figure) of the other first linear part 11a.

In this case, as described above, the pair of the arm parts 12, 12 in both the sides of the turn part 13 radially deviate by the aforementioned deviation amount L1 to each other, and the first linear part 11a is provided in a state of deviating in the outer diameter direction by the deviation amount L1 to the second linear part 11b. Therefore the two coil members 10 can be combined as described above.

Figure 8:
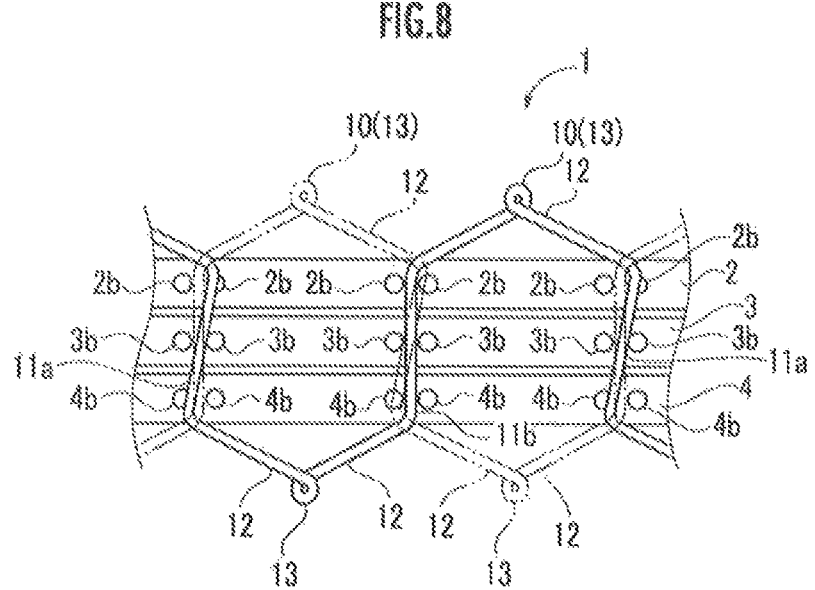
FIG. 8 is a diagram illustrating a state where the two coil members are attached to the retaining apparatus.

Next, an unillustrated jig is used to deform the two coil members 10, 10 annually and attach the two coil members 10, 10 to the retaining apparatus 1 in a state as illustrated in FIG. 8. FIG. 8, for easy understanding, illustrates the retaining apparatus 1 and the two coil members 10, 10 with schematically planar development of a state thereof as viewed from the front and illustrates one of the two coil members 10, 10 in a two-dot chain line. This point can be likewise applied to FIG. 9 to be described later.

As illustrated in this figure, the two coil members 10, 10 are attached to the retaining apparatus 1 in a state where the second linear part 11b of each is inserted and is in a loose fitting state between the upper pins 2b, 2b, the middle pins 3b, 3b and the lower pins 4b, 4b due to lengths of the upper pins 2b, 2b, the middle pins 3b, 3b and the lower pins 4b, 4b as described above. At the same time with this, in a state where one first linear part 11a is positioned in the outer diameter side of the other linear part 11b and a central vicinity of both of them is inserted and is in a loose fitting state between one set of the middle pins 3b, 3b, the two coil members 10, 10 are attached to the retaining apparatus 1.

In this case, the first linear part 11a has the positional relation of deviating to the outer diameter side by the deviation amount L1 to the second linear part 11b and the length of the upper pin 2b and the lower pin 4b as described above is set to a value slightly shorter than the deviation amount L1. Therefore inner diameter side ends of the first linear part 11a are in a state of having a clearance to the upper pin 2b and to the lower pin 4b respectively. As a result, although both the ends of the first linear part 11a in the axis line direction have the positional relation of deviating in the circumferential direction to each other, it is possible to attach the first linear part 11a to the retaining apparatus 1 in the aforementioned state.

Figure 9:
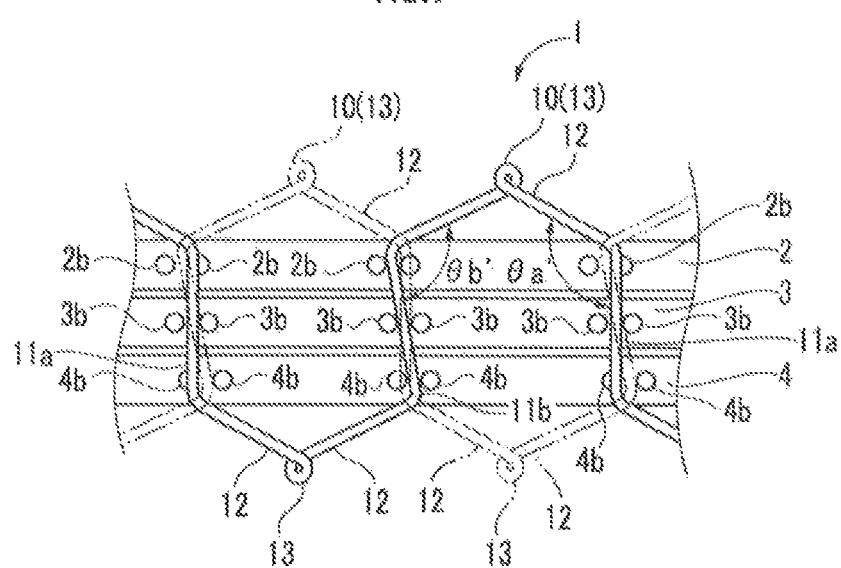
FIG. 9 is a diagram illustrating a state where the two coil members are deformed by the retaining apparatus.

In addition, by rotating the upper body part 2 in a clockwise direction in FIG. 1 and the lower body part 4 in a counterclockwise direction in FIG. 1 respectively by a predetermined angle from the state as illustrated in FIG. 8 by an actuator, the two coil members 10, 10 are deformed to a state as illustrated in FIG. 9 and are retained in that state. That is, the two coil members 10, 10 are deformed to have a positional relation that at the same time an upper end and a lower end of the second linear part 11b deviate to each other in the circumferential opposite sides, accompanied thereby, an upper end and a lower end of the first linear part 11a line up in the axis line direction. As a result, the two coil members 10, 10 are retained in the retaining apparatus 1 in a state of being deformed such that the bent angle θb' between the second linear part 11b and the arm part 12 is made smaller than the bent angle θa' between the first linear part 11a and the arm part 12.

Figure 10:
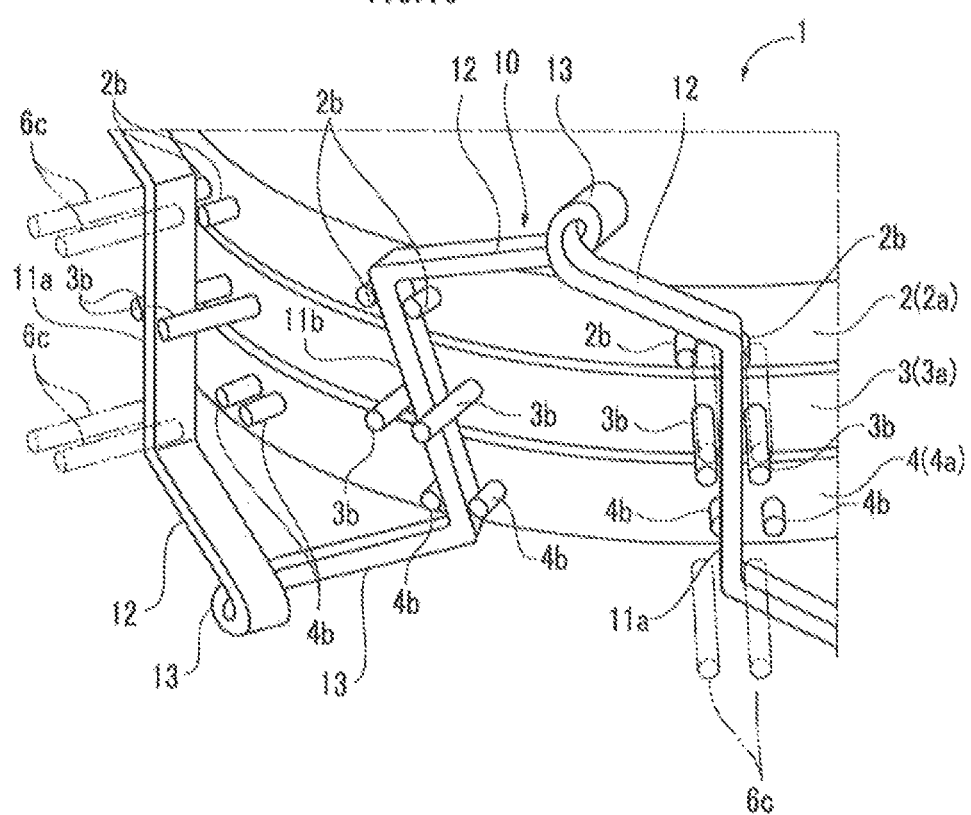
FIG. 10 is a perspective view illustrating a state where the two coil members are deformed and then, are retained by the retaining apparatus.

In this way, in a case where the two coil members 10, 10 are retained in the retaining apparatus 1, as illustrated in FIG. 10, the two coil members 10, 10 become in a state of being retained annually along the outer peripheral surface of the retaining apparatus 1 and an outer diameter of the coil member 10, that is an outer diameter of the first linear part 11a is reduced in a diameter to be smaller than an inner diameter of the stator 6. In FIG. 10, for easy understanding, one of the two coil members 10, 10 is omitted in illustration.

Next, the retaining apparatus 1 of retaining the coil members 10, 10 in a diameter-reducing state as described above is inserted in the stator 6 along the axis line direction of the stator 6 as illustrated in a two-dot chain line in FIG. 4. In this state, a clearance is present between a surface (end plane in the outer diameter side) of the first linear part 11a of the coil members 10, 10 each and an inner peripheral surface (surface of a core tooth 6b) of the stator 6. After that, as illustrated in FIG. 10 and FIG. 11, a pair of guide pins 6c, 6c (guide parts) make one set, and two sets of the guide pins 6c, 6c are set to project to the retaining apparatus 1 from the stator 6-side.

The guide pins 6c, 6c are arranged along the core teeth 6b in both sides of the slot 6a facing the first linear part 11a in a position along both end surfaces outward of the stator 6 in the axis line direction, and a clearance between the guide pins 6c, 6c is set to be slightly larger than a circumferential size of the first linear part 11a. Consequently, as illustrated in FIG. 11, both ends of the first linear part 11a in the axis line direction becomes in a state of being inserted between the two sets of the guide pins 6c, 6c.

Figure 11:
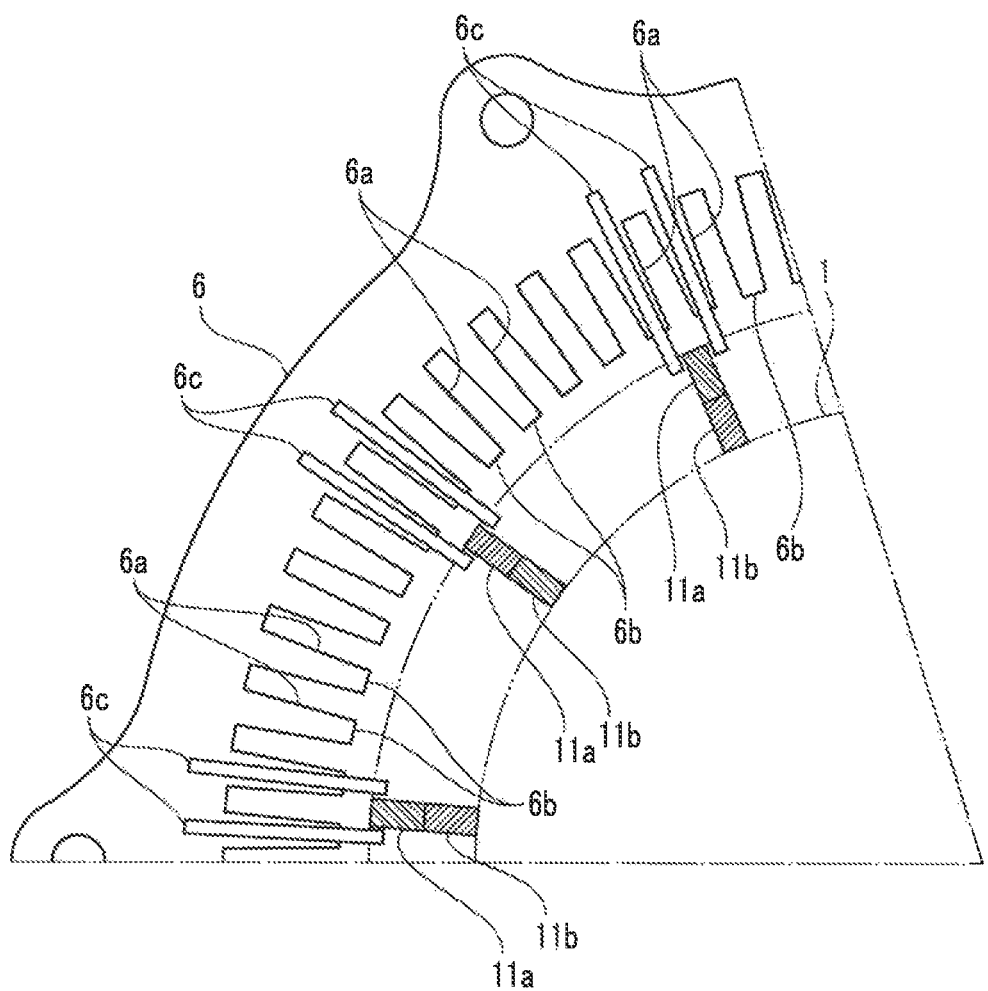
FIG. 11 is a diagram illustrating a state before the two coil members are inserted in a slot.

In FIG. 11, for easy understanding, sections in the center vicinity of the first linear part 11a and the second linear part 11b in the axis line direction are illustrated as a cross-section of the first linear part 11a and the second linear part 11b, and this point can be likewise applied to FIGS. 12 and 13 to be described later.

Next, an unillustrated jig is used to press the arm parts 12 and the turn parts 13 of the two coil members 10, 10 to the stator 6, thus moving the two coil members 10, 10 to the stator 6 while enlarging the two coil members 10,10 in a diameter from the state as illustrated in FIG. 11. Following this, the first linear part 11a moves to the slot 6a while being guided by the two sets of the guide pins 6c, 6c and is positioned in a state of being along the axis line direction, and is therefore inserted in the slot 6a as it is.

Figure 12:
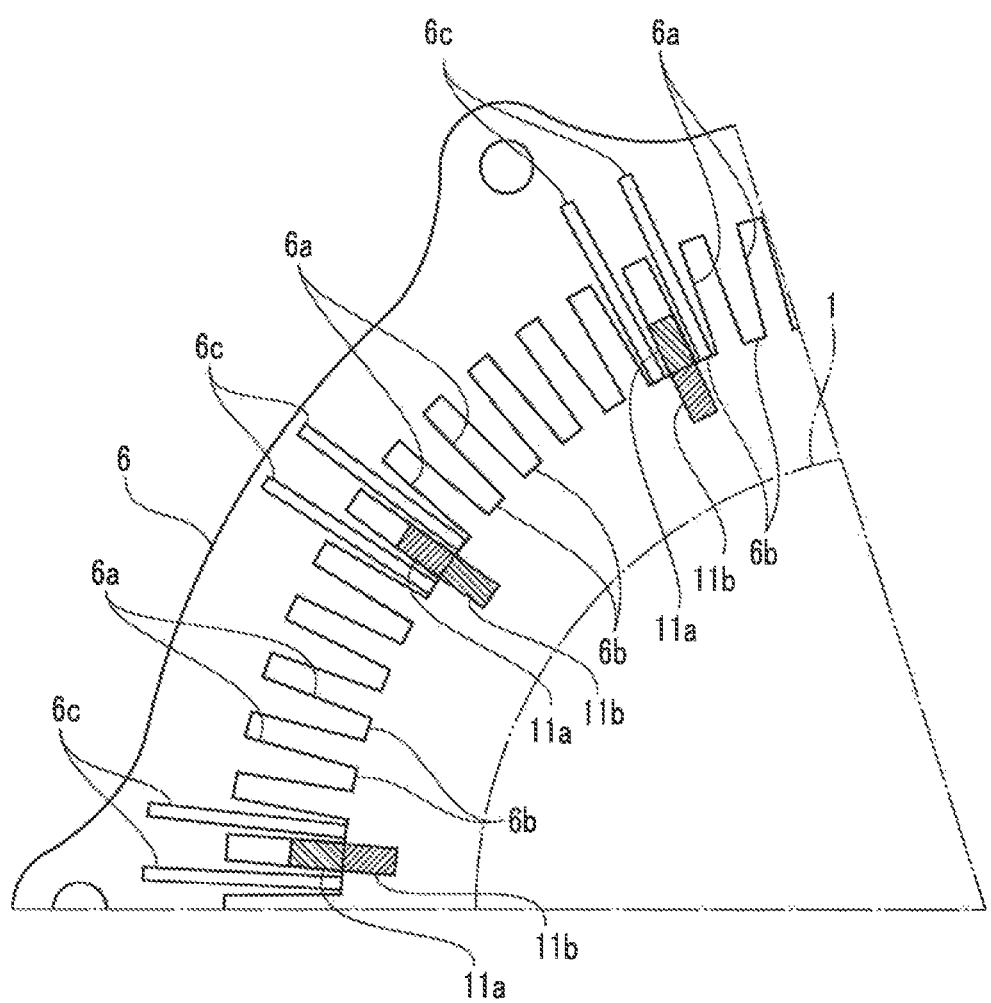
FIG. 12 is a diagram illustrating a state where first linear parts of the two coil members are inserted in the slot.
Figure 13:
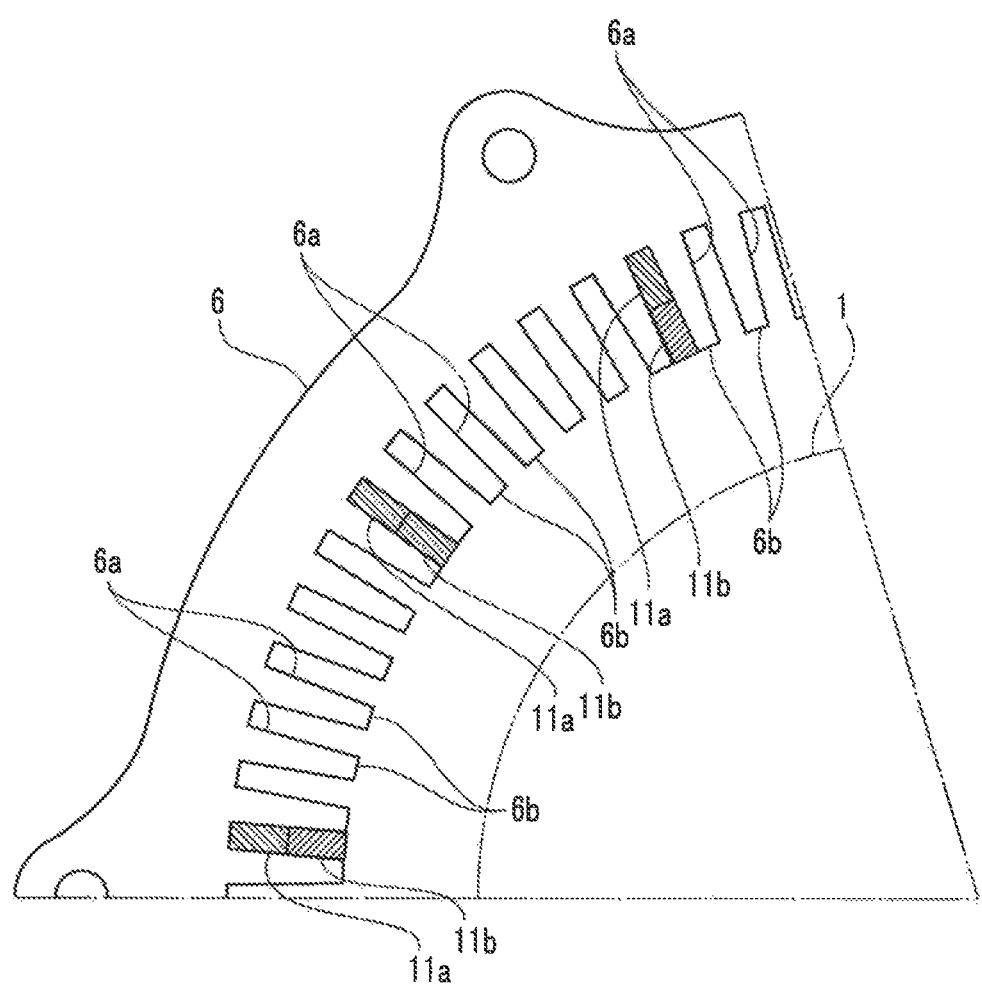
FIG. 13 is a diagram illustrating a state where the first linear part and a second linear part of the two coil members are inserted in the slot.

When the two coil members 10, 10 move to a position as illustrated in FIG. 12, the entirety of the first linear parts 11a of the two is inserted in the slot 6a, and the outer peripheral surface of the second linear part 11b is positioned slightly closer to the inner diameter side than the end plane of the core tooth 6b. In this state, a movement amount of the second linear part 11b from the position as illustrated in FIG. 11 to the position as illustrated in FIG. 12 amounts to the aforementioned deviation amount L1 and the clearance between the coil member 10 and the core tooth 6b as illustrated in FIG. 4, thereby creating a state where the second linear part 11b is out of between the upper pins 2b, 2b and the lower pins 4b, 4b.

Consequently an unillustrated jig is used to make it possible to deform the second linear part 11b from a state (state as illustrated in FIG. 9) where both ends thereof deviate to each other in the circumferential opposite sides to the axis line direction to a state (state as illustrated in FIG. 8) of being along the axis line direction. Therefore the second linear part 11b is deformed in such a way.

In this way, after deforming the second linear part 11b to the state of being along the axis line direction, the unillustrated jig is used to press the arm parts 12 and the turn parts 13 of the two coil members 10, 10 to the outer diameter, thus causing the second linear part 11b to be inserted in the slot 6a together with the first linear part 11a. Finally both of the first linear part 11a and the second linear part 11b are inserted in the slot 6a until coming to a state as illustrated in FIG. 13, thus finishing the attachment of the two coil members 10, 10 to the stator 6.

As described above, according to the retaining apparatus 1 of the present embodiment, the first linear part 11a and the second linear part 11b in the coil member 10 of the wave winding coil 9 are deformed from the state as illustrated in FIG. 2B to the state as illustrated in FIG. 6 by the unillustrated jig. In the state as illustrated in FIG. 6, the second linear part 11b is in a state of being along the axis line direction of the coil member 10, and both the ends of the first linear part 11a in the axis line direction deviate to each other in the circumferential opposite sides to the axis line direction of the coil member 10, and the bent angle θa between the first linear part 11a and the arm part 12 is made smaller than the bent angle θb between the second linear part 11b and the arm part 12.

Figure 7:
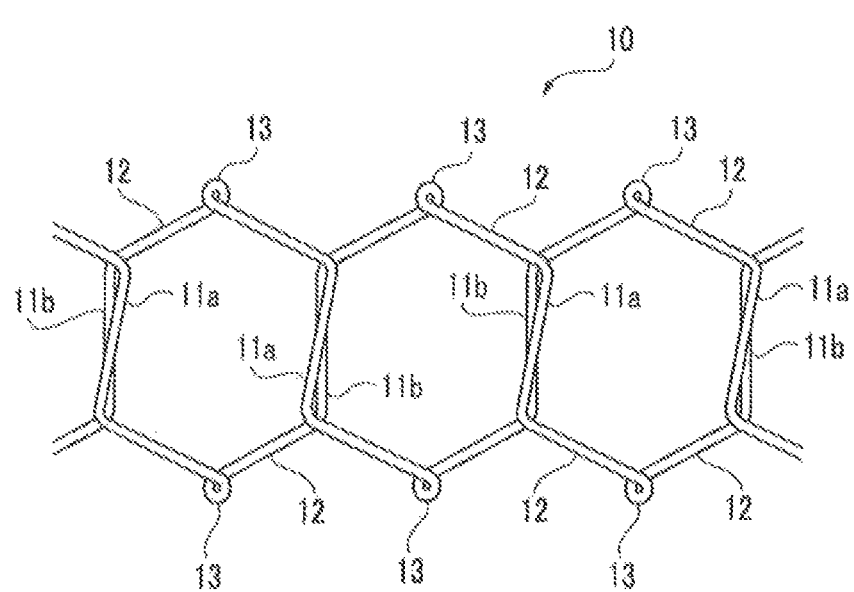
FIG. 7 is a diagram illustrating a state where two coil members are combined before being attached to the retaining apparatus.

After combining the two coil members 10, 10 as illustrated in FIG. 7, in a case where the coil members 10, 10 are reduced in a diameter and are attached to the retaining apparatus 1, the first linear part 11a, the second linear part 11b, the arm part 12 and the turn part 13 are simultaneously moved to the inner diameter side. At this moment, since the bent angle θa between the first linear part 11a and the arm part 12 is made smaller than the bent angle θb between the second linear part 11b and the arm part 12, the coil member 10 moves to the inner diameter side while deforming such that the curvature of the turn part 13 is made larger at the same time this bent angle θa is made smaller.

In this way, at the time of attaching the coil member 10 to the retaining apparatus 1 while reducing a diameter of the coil member 10, it is possible to move the first linear part 11a, the arm part 12 and the turn part 13 to the inner diameter side while deforming the coil member 10 as described above. Consequently the load at the diameter reduction can be made smaller than when the first linear part 11a and the second linear part 11b are configured to be in parallel with each other.

In addition thereto, since the first linear part 11a is arranged closer to the outer diameter side by the aforementioned deviation amount L1 than the second linear part 11b, the load at the diameter reduction can be further reduced as compared to when the second linear part 11b is deformed from the state as illustrated in FIG. 2B to the state as illustrated in FIG. 9 and is then reduced in a diameter.

The coil members 10, 10 are deformed as illustrated in FIG. 9 and are retained by the retaining apparatus 1, and at the time of attaching the coil members 10, 10 to the stator 6 from that state, the coil members 10, 10 are pressed to the stator 6-side by an unillustrated jig to move from a position as illustrated in FIG. 11 to a position as illustrated in FIG. 12 while being enlarged in a diameter. Following this, the first linear part 11*a*, the second linear part 11*b*, the arm part 12 and the turn part 13 simultaneously move to the stator 6-side. At this moment, since the bent angle θb' between the second linear part 11*b* and the arm part 12 is made smaller than the bent angle θa' between the first linear part 11*a* and the arm part 12, the coil member 10 moves to the stator 6-side while deforming such that the curvature of the turn part 13 is made smaller at the same time this bent angle θb' is made larger.

In this way, at the time of attaching the coil member 10 to the stator 6 while increasing a diameter of the coil member 10, it is possible to move the first linear part 11*a*, the arm part 12 and the turn part 13 while being deformed as described above. Consequently the load at the diameter enlargement can be made smaller than when being enlarged in a diameter from a state where the first linear part 11*a* and the second linear part 11*b* are configured to be in parallel with each other.

In addition thereto, the second linear part 11*b* is arranged closer to the inner diameter side by the aforementioned deviation amount L1 than the first linear part 11*a*. Consequently when the coil member 10 moves from the position as illustrated in FIG. 11 to the position as illustrated in FIG. 12 and is enlarged in a diameter, the second linear part 11*b* can be deformed to a state of being along the axis line direction of the coil member 10 and the load at the deforming work can be reduced.

The upper body part 2 and the lower body part 4 in the retaining apparatus 1 are configured to be rotatable in opposite directions to each other, and in the state as illustrated in FIG. 8, the sections in both the ends of the second linear part 11*b* in the axis line direction are in a loose fitting state between the upper pins 2*b*, 2*b* and between the lower pins 4*b*, 4*b*, and the central parts of the first linear part 11*a* and the second linear part 11*b* in the axis line direction are in a loose fitting state between the middle pins 3*b*, 3*b*. Consequently the two coil members 10, 10 can be easily deformed from the state as illustrated in FIG. 8 to the state as illustrated in FIG. 9, and at the same time, can be easily retained in the state as illustrated in FIG. 9.

Further, since the first linear part 11*a* is guided by the two sets of the guide pins 6*c*, 6*c* to be inserted in the slot 6*a* at the diameter enlargement, the work of inserting the first linear part 11*a* in the slot 6*a* can be easily executed.

The embodiment is an example in which the coil member 10 in the state as illustrated in FIGS. 2A and 2B is reduced in a diameter and is attached to the retaining apparatus 1 after deforming the first linear part 11*a* to the state as illustrated in FIG. 6 by a jig, and after that, the first linear part 11*a* and the second linear part 11*b* are deformed to the state as illustrated in FIG. 9 and are retained by the retaining apparatus 1. However, the method for retaining the coil member 10 by the retaining apparatus 1 is not limited to this example, and the present invention may use any method in which the coil member 10 is reduced in a diameter and is retained in the state as illustrated in FIG. 9 by the retaining apparatus 1.

For example, the coil member 10 in the state as illustrated in FIGS. 2A and 2B is annually reduced in a diameter and is attached to the retaining apparatus 1 as it is, and after that, by rotating the upper body part 2 and the lower body part 4 of the retaining apparatus 1 in the opposite directions to each other, the coil member 10 may be deformed and retained to the state as illustrated in FIG. 9. Comparing this method with the method in the embodiment, the method in the embodiment is more advantageous in terms of reducing the load at the diameter reduction.

In addition, as another method, a deforming movement of the coil member 10 by the retaining apparatus 1 may be omitted. That is, after the second linear part 11*b* of the coil member 10 in the state as illustrated in FIGS. 2A and 2B is deformed to the same state as the state as illustrated in FIG. 9 by an unillustrated jig, the coil member 10 may be annually reduced in a diameter and be attached to the retaining apparatus 1. In this method, the load at each of the diameter reduction and the diameter enlargement can be reduced in the same way as the method in the embodiment.

The embodiment is an example in which the wave winding coil 9 is formed by combining the coil members 10 each having the turn part 13, but the wave winding coil in the present invention is not limited thereto, and may comprise a wave winding coil including the first linear part 11*a* and the second linear part 11*b*, and the connecting parts alternately connecting between one ends of the first linear part 11*a* and the second linear part 11*b* and between the other ends of the first linear part 11*a* and the second linear part 11*b* in the circumferential direction.

For example, there may be used a coil member in which in the coil member 10 as illustrated in FIGS. 2A and 2B, the turn part 13 is eliminated and the ends of the first linear part 11*a* and the second linear part 11*b* are connected with a connecting part in a state of being positioned on the same plane (that is, in a state of not deviating to each other radially). In a case of using such a coil member 10, after retaining the single coil member 10 only in the retaining apparatus 1 in the state as illustrated in FIG. 9, the coil member 10 is enlarged in a diameter and is pressed to the slot 6*a*, and after the second linear part 11*b* is deformed to a state of being along the axis line direction of the stator 6 in a position immediately before being inserted in the slot 6*a* by an unillustrated jig, the second linear part 11*b* may be inserted in the slot 6*a*.

The embodiment is an example of using the retaining part including the upper pins 2*b*, 2*b*, the middle pins 3*b*, 3*b* and the lower pins 4*b*, 4*b*, but the present invention is not limited thereto, and may use a retaining part of retaining a first linear part of a wave winding coil in a state of being along the axis line direction of the wave winding coil and retaining a second linear part such that sections in both ends of the second linear part in the axis line direction deviate to each other in circumferential opposite sides of the wave winding coil to the axis line direction of the wave winding coil and a bent angle between the second linear part and the connecting part is made smaller than a bent angle between the first linear part and the connecting part. For example, the retaining part may include a pair of prismatic columnar members and a pair of convex parts.

Further, the embodiment is an example in which the first retaining part includes a total of 12 sets of the upper pins 2*b*, 2*b* and the lower pins 4*b*, 4*b*, the one set being composed of a pair of the upper pins 2*b*, 2*b* and a pair of the lower pins 4*b*, 4*b*. However, the first retaining part of the present invention is not limited thereto, and may be composed of one or more of the sets. For example, one or more sets of first retaining parts may be provided, including a pair of upper pins 2*b*, 2*b* and a pair of lower pins 4*b*, 4*b* as one set. Further, one or more sets of first retaining parts may be provided, including a pair of upper pins 2*b*, 2*b* or a pair of lower pins 4*b*, 4*b* as one set.

In addition, the embodiment is an example in which the second retaining part includes a total of 12 sets of the middle pins 3b, 3b. However, the second retaining part of the present invention is not limited thereto, and may include at least one pin. For example, a second retaining part may include one set of middle pins 3b, 3b only or one middle pin 3b only.

The embodiment is an example in which the apparatus body is formed by combining the upper body part 2, the middle body part 3 and the lower body part 4, but the apparatus body in the present invention is not limited thereto, and is only required to be provided with a retaining part. For example, an apparatus body may be formed by fixing the upper body part 2, the middle body part 3 and the lower body part 4 integrally. In that case, an upper pins 2b, 2b and lower pins 4b, 4b as the retaining part may be configured to be movable in the circumferential opposite sides to each other.

REFERENCE SIGNS LIST

1 Retaining apparatus
2 Upper body part (apparatus body, first apparatus body)
2a Outer peripheral surface
2b Upper pin (retaining part, first retaining part)
3 Middle body part (apparatus body, third apparatus body)
3a Outer peripheral surface
3b Middle pin (retaining part, second retaining part)
4 lower body part (apparatus body, second apparatus body)
4a Outer peripheral surface
4b Lower pin (retaining part, first retaining part)
6 Stator
6a Slot
6c Guide pin (guide part)
9 Wave winding coil
10 Coil member
11 Linear part
11a First linear part
11b Second linear part
12 Arm part (connecting part)
13 Turn part (connecting part)
θa' Bent angle between first linear part and connecting part
θb' Bent angle between second linear part and connecting part
L1 Deviation amount (predetermined distance)

What is claimed is:

1. A retaining apparatus of a wave winding coil, the wave winding coil including: first linear parts and second linear parts that are alternately provided with predetermined intervals in a circumferential direction; and
connecting parts that alternately connect between one end of each of the first linear parts and one end of each of the second linear parts and between the other end of each of the first linear parts and the other end of each of the second linear parts, and the retaining apparatus comprising:
an apparatus body having a cylindrical outer peripheral surface; and
retaining parts that are provided to project from the cylindrical outer peripheral surface of the apparatus body to retain the wave winding coil, wherein the retaining parts include first retaining parts aligned in a circumferential direction of the cylindrical outer peripheral surface of the apparatus body along an axis line direction of the apparatus body on the cylindrical outer periphery surface of the apparatus body, so as to retain the first linear parts in a state of being along the axis line direction of the apparatus body, and the retaining parts include second retaining parts which are offset from each other in the circumferential direction of the cylindrical outer peripheral surface of the apparatus body along the axis line direction of the apparatus body, so as to retain the second linear parts in a state where sections of both ends of each of the second linear parts in the axis line direction of the apparatus body deviate from each other in circumferential opposite sides of the apparatus body with respect to the axis line direction of the apparatus body and in a state where a bent angle between each of the second linear parts and the each of the connecting parts is made smaller than a bent angle between each of the first linear parts and each of the connecting parts,
wherein
the second retaining parts includes a pair of second retaining parts arranged to be separated from each other in the axis line direction of the apparatus body,
the pair of the second retaining parts are configured to be movable relatively to the circumferential direction of the apparatus body, and retain the sections of both the ends of each of the second linear parts in the axis line direction in a state of deviating to each other in the circumferential opposite sides of the wave winding coil,
the retaining parts are arranged along the circumferential direction of the apparatus body,
at least one of the second retaining parts is configured to retain a predetermined section of the respective second linear part between the sections in both the ends of the respective second linear part,
the second retaining parts deform the sections of both the ends of the respective second linear part in the axis line direction to deviate to each other in the circumferential opposite sides of the wave winding coil and then retain the sections in a deformed state,
the apparatus body includes:
a first apparatus body that has an outer peripheral surface in a cylindrical surface shape and is provided with one of the pair of the second retaining parts on the outer peripheral surface;
a second apparatus body that has an outer peripheral surface in a cylindrical surface shape and is provided with the other of the pair of the second retaining parts on the outer peripheral surface; and
a third apparatus body that is arranged between the first apparatus body and the second apparatus body, has an outer peripheral surface in a cylindrical surface shape and is provided with the first retaining part on the outer peripheral surface,
the first apparatus body to the third apparatus body are arranged coaxially with each other with respect to the axis line of the apparatus body, and
the first apparatus body and the second apparatus body are configured to be rotatable in opposite directions to each other along the circumferential direction of the apparatus body.

2. The retaining apparatus of the wave winding coil according to claim 1, wherein each of the pair of the second retaining parts includes a pair of pins retaining each of the second linear parts in a way of sandwiching from both sides in the circumferential direction.

3. The retaining apparatus of the wave winding coil according to claim 1, further comprising a guide part that extends radially along the slot outward of the stator and guides the first linear parts to the slots at the time of diameter enlargement of the wave winding coil.

* * * * *